(12) United States Patent
Thomas et al.

(10) Patent No.: US 6,435,541 B1
(45) Date of Patent: Aug. 20, 2002

(54) MODULAR AIR BAG HOUSING

(75) Inventors: David James Thomas, Villa Hills, KY (US); Mark Thomas Winters, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/747,326

(22) Filed: Dec. 21, 2000

(51) Int. Cl.[7] ............................................. B60R 21/20
(52) U.S. Cl. .................... 280/728.2; 280/732; 72/379.4; 72/256; 72/348
(58) Field of Search .............................. 280/728.2, 732; 72/379.4, 256, 348; 29/DIG. 47

(56) References Cited

U.S. PATENT DOCUMENTS

| | | | | | |
|---|---|---|---|---|---|
| 4,345,360 | A | * | 8/1982 | Ridout .......................... 72/256 |
| 5,121,941 | A | * | 6/1992 | Mihm et al. ................. 280/732 |
| 5,556,127 | A | * | 9/1996 | Hurford et al. ........... 280/730.2 |
| 5,609,354 | A | * | 3/1997 | Lauritzen et al. ......... 280/728.2 |
| 5,620,200 | A | * | 4/1997 | Garner et al. ............. 280/728.2 |
| 5,634,657 | A | * | 6/1997 | Rose et al. ............... 280/728.2 |
| 5,649,442 | A | * | 7/1997 | Yoshikawa et al. ........... 72/256 |
| 5,676,390 | A | * | 10/1997 | Olson ....................... 280/728.2 |
| 5,775,724 | A | * | 7/1998 | Tonooka et al. ........... 280/728.2 |
| 5,839,751 | A | * | 11/1998 | Lutz .......................... 280/728.2 |
| 5,967,551 | A | * | 10/1999 | Newkirk et al. ............. 280/740 |
| 6,126,191 | A | * | 10/2000 | Pepperine et al. ........ 280/728.2 |

FOREIGN PATENT DOCUMENTS

| | | | |
|---|---|---|---|
| DE | 43 18 279 A1 | * | 12/1993 |
| EP | 0 739 788 A1 | * | 10/1996 |
| EP | 0 800 960 A2 | * | 10/1997 |
| JP | 405286403 A | * | 11/1993 |
| JP | 406127323 A | * | 5/1994 |

* cited by examiner

Primary Examiner—Paul N. Dickson
Assistant Examiner—Ruth Ilan
(74) Attorney, Agent, or Firm—Kathryn A. Marra

(57) ABSTRACT

A containment structure for housing an inflatable air bag cushion and inflator. Extrusion processes are used to form the portion of the containment structure which houses the inflatable air bag cushion while non-extrusion processes are used to form the portion of the containment structure which houses the inflator in fluid communication with the inflatable cushion. The portion of the containment structure which houses the inflatable air bag cushion is preferably formed from a lightweight, readily deformable material and will preferably be formed from extruded aluminum or plastic. The portion of the containment structure housing the inflator is preferably formed by a deep drawing or molding process so as to include an integral chamber sized for the acceptance and storage of the inflator therein.

9 Claims, 3 Drawing Sheets

MODULAR AIR BAG HOUSING

TECHNICAL FIELD

The present invention relates to an air bag housing structure, and more particularly to an air bag housing structure incorporating an extruded cushion housing for storage of an inflatable air bag cushion therein.

BACKGROUND OF THE INVENTION

It is well known in the prior art to provide an air bag module which includes an inflatable air bag cushion for protection of a vehicle occupant in the event of a collision. The air bag module typically includes an inflator for discharging an inflation medium to inflate the air bag cushion upon the occurrence of a predetermined level of vehicle deceleration or other measurable condition.

The inflator and the air bag cushion are typically stored within a housing structure of substantially unitary construction. Such a housing is generally defined by opposing side walls which are joined by a bottom wall and opposing end walls to define a deep trough-like structure which is open at the top. One end wall typically includes an enlarged opening for receiving the inflator therethrough during the assembly process. The inflator is typically of a substantially cylindrical configuration including a plurality of gas discharge openings disposed about one end. The air bag cushion is typically stored in a folded condition atop the inflator within the depression existing between the walls of the housing.

Upon activation of the inflator, the air bag cushion is filled with a predetermined quantity of the inflation medium discharged by the inflator thereby causing the air bag cushion to deploy outwardly through the top opening formed by the side walls and end walls of the housing structure. The air bag cushion typically includes a means of attachment to the housing such as a retaining rod attached to the rim of the housing so as to hold the air bag cushion in place relative to the housing during the inflation process.

Initial prior art housings were formed from stamped steel which yields an enclosure of high strength. However, such a structure has the detriment of adding a relatively substantial mass to the vehicle structure and may require corrosion resistance treatment prior to installation.

In order to overcome the deficiencies of stamped steel housings, it has been proposed to utilize aluminum housings formed by plastic deformation through a deep drawing process so as to yield the desired walled construction. While such an aluminum housing formed entirely by a deep drawing process offers the potential benefits of low weight in combination with excellent corrosion resistance, the deep drawing of aluminum has inherent depth restrictions due to the naturally occurring thinning at the lower portions of the formed structure as the depth of the draw is increased.

It has also been proposed to utilize an aluminum extrusion process to form an open ended structure for housing both the air bag cushion and inflator and to thereafter attach steel or magnesium end caps to close off both ends of the housing and form the desired enclosure. Such an extruded housing of aluminum offers the benefits of low weight and controlled uniform wall thickness. However, since the structure formed by such an extrusion process will be substantially uniform along its entire length, it is difficult to accommodate a number of variations of air bag cushions and inflators within a housing formed exclusively by such an extrusion process with subsequently applied end caps. Specifically, if the inflator is shorter than the required cushion containment portion of the housing, the overall structure must undergo substantial post processing to accommodate the inflator or a relatively complex end cap design must be utilized.

It has also been proposed to utilize housings formed entirely from injection molded plastic. However, due to the wide variety of air bag cushions and inflators which are utilized, the cost and lead time for the required injection molding equipment may be prohibitive.

Finally, it has been proposed to form housings entirely from relatively lightweight die cast materials such as magnesium. However, the cost of such materials may be prohibitive.

SUMMARY OF THE INVENTION

This invention provides an advantageous containment structure for housing an inflatable air bag cushion and inflator which utilizes extrusion processes to form the portion of the containment structure which houses the inflatable cushion while utilizing non extrusion processes to form the portion of the containment structure which houses the inflator in fluid communication with the inflatable cushion. The portion of the containment structure which houses the inflatable air bag cushion is preferably formed from a lightweight, readily deformable material and will preferably be formed from extruded aluminum or plastic. The portion of the containment structure housing the inflator is preferably formed by a deep drawing or molding process so as to include an integral chamber sized for the acceptance and storage of the inflator therein. The portions of the containment structure housing the inflatable air bag cushion and the inflator may either be formed as separate elements or may be part of a unitary construction.

Advantageously, the containment structure, according to the present invention, permits the substantial utilization of aluminum or other low cost, lightweight, extrudable materials. The present invention provides the added advantage of utilizing a combination of extrusion and non-extrusion formation techniques such that the portion of the structure which houses the inflatable air bag cushion may be formed substantially by extrusion processes thereby gaining the benefit of highly efficient extrusion practices. Non-extrusion formation techniques such as deep drawing may be used in the formation of the three dimensional chamber for housing the inflator. It has been found that the combination of extrusion and non-extrusion formation practices for forming different portions of the same containment structure provides substantial synergistic benefits by permitting the utilization of lightweight materials throughout the containment structure and by permitting substantial versatility in the configuration of the chamber housing the inflator.

According to one potentially preferred aspect of the present invention, these advantages and features are accomplished by providing an air bag containment structure which includes a cushion housing formed from aluminum or plastic by the forced extrusion of such material. The cushion housing is of a depressed open-ended channel configuration having a recess between opposing side wall elements. The recess formed between the side wall element is dimensioned to accept a folded inflatable air bag cushion therewithin. End caps made of a material compatible with the material forming the cushion housing are attached across the open ends of the extruded cushion housing to form a three dimensional walled enclosure within which the air bag cushion is housed.

An inflator housing formed of a material compatible with the cushion housing and including an integral chamber of depressed profile for storage of a gas emitting inflator is connected to the cushion housing such that the gas emitting inflator is in fluid communication with the inflatable air bag cushion. The chamber of depressed profile for storage of the gas emitting inflator is formed by non extrusion formation techniques, and is preferably formed from deep drawn aluminum. The portion of the containment structure which houses the inflator may be integral with the portion housing the inflatable air bag cushion. In the event that the portion of the containment structure housing the inflator is discrete from the portion housing the inflatable air bag cushion, the inflator housing portion may include outwardly extending flange structures which cooperatively engage the open ends of the cushion housing thereby serving as end caps for the cushion housing. The air bag containment structure may be formed entirely from aluminum if desired.

Thus, it will be appreciated that the present invention provides a substantial degree of versatility in the manufacturing process thereby permitting the more efficient utilization of materials of construction and formation techniques within a wider variety of structural configurations. The present invention thereby yields a highly efficient, cost effective and lightweight containment structure for use in housing an inflatable air bag cushion and inflation element.

BRIEF DESCRIPTION OF THE DRAWINGS

The principles of the present invention are set forth in the following detailed description through reference to the accompanying drawings which are incorporated in and constitute a part of this specification in which.

While the invention has been illustrated and generally described above, and will hereafter be described in detail in connection with certain potentially preferred embodiments, it is to be appreciated that the foregoing general description as well as the particularly illustrated and described embodiments as may be set forth herein are intended to be exemplary and explanatory only. Accordingly, there is no intention to limit the invention to such particularly illustrated and described embodiments. On the contrary, it is intended that the present invention shall extend to all alternatives, modifications, and equivalents as may embody the broad aspects and principles of the invention within the full spirit and scope thereof.

DESCRIPTION OF THE PREFERRED EMBODIMENTS

Figure 1:
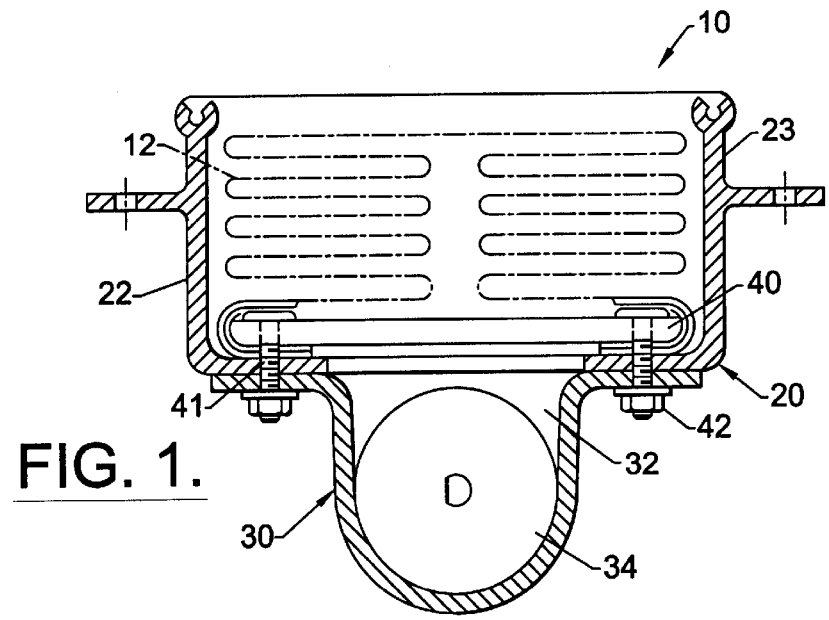
FIG. 1. is a cut-away end view of an air bag containment structure according to the present invention including an inflatable air bag cushion and gas emitting inflator disposed therein.
Figure 2:
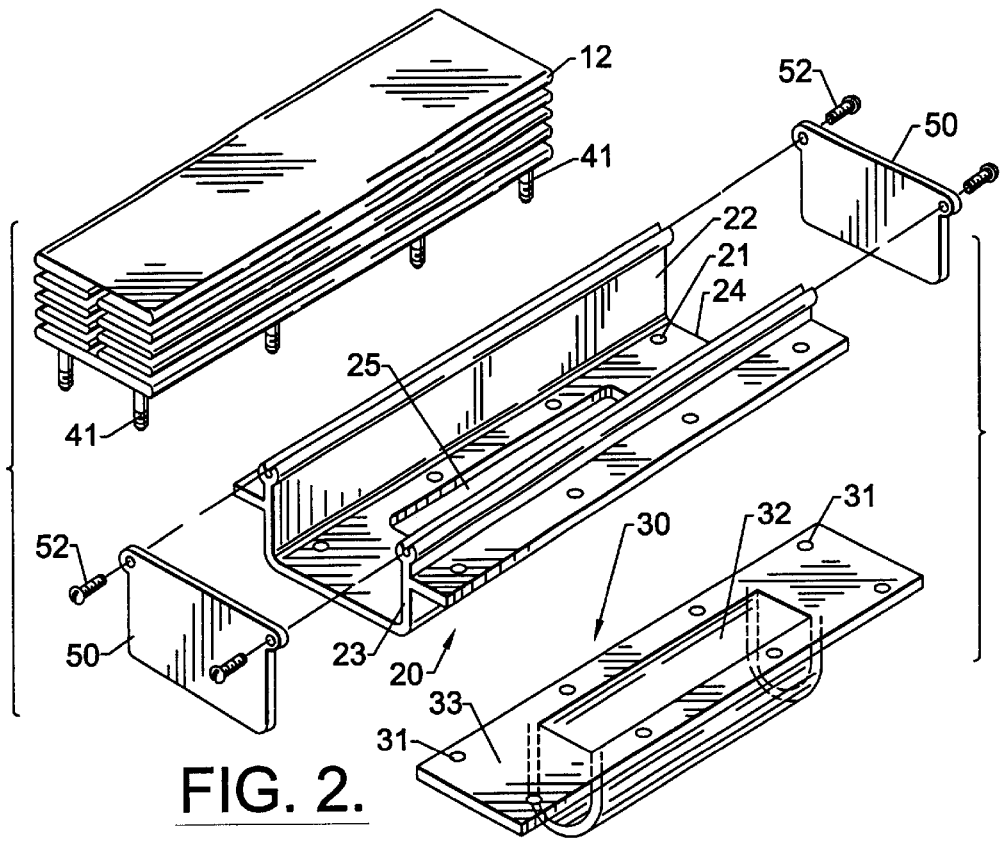
FIG. 2 is an exploded perspective view of the components of an air bag containment structure according to the present invention.
Figure 4:
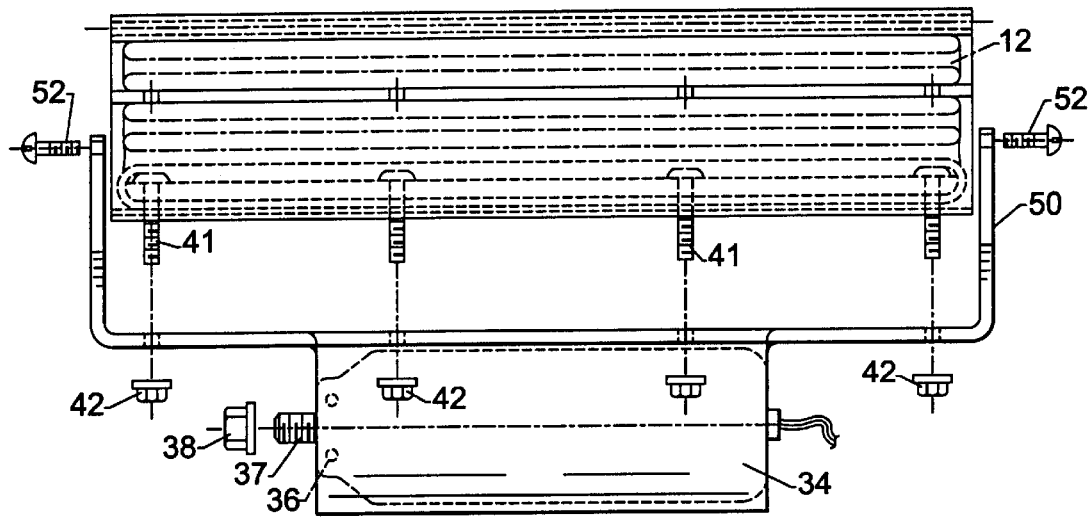
FIG. 4 is a cut-away side view of an air bag containment structure according to the present invention.

Referring to FIGS. 1, 2, and 4 an air bag module 10 such as may be mounted in a vehicle (not shown) for protection of a vehicle occupant is provided. As illustrated, the air bag module 10 houses an inflatable air bag cushion 12. Such an air bag cushion 12 is typically formed of a substantially pliable material such as a coated or uncoated woven fabric which may be folded for storage within an air bag housing structure 20 as will be described further hereinafter.

The air bag module 10 further includes an inflator housing structure 30 for connection to the air bag housing structure 20. As will be discussed further hereinafter, the inflator housing structure 30 may be formed either separately from or integrally with the air bag housing structure 20. In either configuration, the inflator housing structure 30 preferably includes a walled chamber 32 of depressed profile for housing a gas emitting inflator 34. As will be appreciated, the end walls of the chamber 32 preferably include openings for the insertion of the inflator 34 therein during the assembly process in a manner well known to those of skill in the art so as to achieve an assembled construction as illustrated in FIG. 4.

The inflator 34 may be of any conventional construction for generating inflator gas to inflate the air bag cushion 12 although a generally cylindrical configuration may be preferred for ease of insertion within the walled chamber 32. As best seen in FIG. 4, such a cylindrical inflator 34 preferably includes a plurality of discharge ports 36 which are spaced around the neck portion of the inflator 34. Such an inflator also preferably includes an outwardly extending mounting stud 37 for passage through a corresponding aperture in one end wall of the chamber 32 for securement by a mounting nut 38 as shown. According to the potentially preferred embodiment of the present invention, the length of the chamber 32 will be substantially equivalent to the length of the body of the inflator 34 thereby permitting the inflator to be supported along its length.

The inflatable air bag cushion 12 may be secured to a retainer ring 40 (FIG. 1) from which extend a plurality of pressed studs 41. These pressed studs 41 may pass through corresponding apertures 21, 31 within the air bag housing structure 20 and inflator housing structure 30 respectively as shown. The orientation of these structural components may be maintained by mounting nuts 42 attached to the pressed studs 41 as shown.

According to the illustrated and potentially preferred embodiment of the present invention, the air bag housing structure 20 is of a recessed channel configuration having two opposing side walls 22, 23 joined by a bottom wall 24. As best seen in FIG. 2, a gas communication slot 25 is preferably disposed at the interior of the bottom wall 24 for transmission of inflating gas from the inflator 34 into the air bag cushion 12. End caps 50 are preferably attached to the open ends of the air bag housing structure 20 thereby providing a three dimensional walled enclosure with an open top in which the air bag cushion 12 may reside.

In accordance with the present invention, the recessed configuration of the air bag housing structure 20 is preferably formed by a forced extrusion process. Such a process yields a part of substantially controlled cross-sectional configuration along its length. Moreover, the thickness of the walls of a part formed by forced extrusion may be controlled in all regions of the part. Such close control permits the production of parts of highly reproducible quality.

Forced extrusion is carried out by passing an article through a die of defined configuration thereby forcing the article to substantially conform to that configuration. In order to achieve such conformance of configuration, the force applied to the article undergoing extrusion must exceed the critical resolved shear stress of the material forming the article such that substantially permanent plastic deformation of the material may take place. However, the applied forces to which the material is subjected must not be so great as to result in undue embrittlement and/or fracture of the material. One material which is believed to be particularly suitable to undergo such extrusion processing is aluminum. Other materials as may be suitable for extrusion processing include, by way of example only, and not limitation, other face centered cubic metals as well as plastics.

As will be appreciated, the extrusion formation process yields an air bag housing structure 20 of a substantially open-ended construction. Thus, the application of end caps 50 may be desirable in order to substantially contain the inflatable air bag cushion 12 and to define a path of travel for the air bag cushion 12 as it is inflated. The end caps 50 may be formed from any material which is compatible with the material from which the air bag housing structure 20 is formed and will preferably be substantially flat pieces of plastic although other materials including aluminum and steel are also contemplated.

As shown, the inflator housing 30 preferably includes a base plate 33 from which the walled chamber 32 distends. The upper surface of the base plate 33 may be applied to the lower surface of the bottom wall 24 such that there is substantial alignment between the corresponding aperture 21, 31, to permit securement by the pressed studs 41 and mounting nuts 42 in the manner previously described. In such an arrangement, the opening to the walled chamber 32 within the inflator housing 30 will preferably be aligned with the gas communication slot 25 thereby providing fluid communication between the inflator 34 and the air bag cushion 12.

While the lengths of the air bag housing structure 20 and the inflator housing structure 30 may be substantially equivalent, such a relation is not necessary. Thus, the length of the inflator housing structure 30 may be selected based on the dimensions of the inflator 34 to be housed therein independently of the air bag housing structure 20, provided that suitable attachment and fluid communication are maintained.

Due to the substantially closed configuration of the end walls of the chamber 32, it is contemplated that the inflating housing structure is preferably formed by a suitable non-extrusion process. According to the potentially preferred practice, the desired configuration of the inflator housing structure 30 is achieved by a deep drawing procedure wherein the walled chamber 32 is formed by the application of force across the base plate 33 to conform to a final desired geometry. In order to form the walled chamber 32 by such a deep drawing operation, it is desirable that the material from which the inflator housing structure 30 is formed is of a relatively easily deformable character. However, material must also be structurally suitable for the containment of the gas emitting inflator 34 during activation.

According to the potentially preferred practice, the inflator housing structure will be formed from a metallic material such as aluminum due to its lightweight character. However, it is also contemplated that other materials such as steel and the like may also be utilized. While a deep drawn metallic material may be potentially preferred in the construction of the inflator housing structure 30, it is also contemplated that injection molding or die casting techniques of materials such as plastic or magnesium respectively can likewise be utilized. Such materials offer the advantages of light weight and avoid the use of deep drawing or other mechanical deformation processes.

Figure 3:
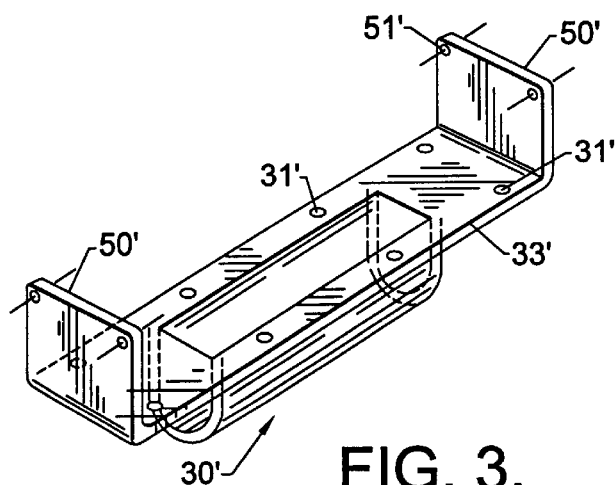
FIG. 3 is a perspective view of an inflator housing including integral end cap elements for use in an air bag containment structure according to the present invention.

It is to be understood that the present invention is susceptible to a wide variety of alternatives and modifications. By way of example only, in FIG. 3 there is illustrated an alternative embodiment of the inflator housing structure wherein elements of like character as illustrated in FIG. 2 are designated by like reference numerals with a prime. As shown, in the alternative embodiment of FIG. 3, the end caps for the air bag housing structure are formed integrally with the base plate 33 of the inflator housing structure 30. As will be appreciated, such a configuration may be achieved by bending the lateral sides of the base plate 33 upwardly to a desired degree. In the alternative, such a configuration may be achieved by injection molding or die casting operations.

During assembly, the integral end caps 50' slide over the open ends of the air bag housing structure 20 thereby providing a walled containment structure for the air bag cushion as may be desired. If desired, the integral end caps 50' may be provided with apertures 51 for introduction of mounting screws or other attachment devices as may be desired to promote structural stability.

Figure 5:
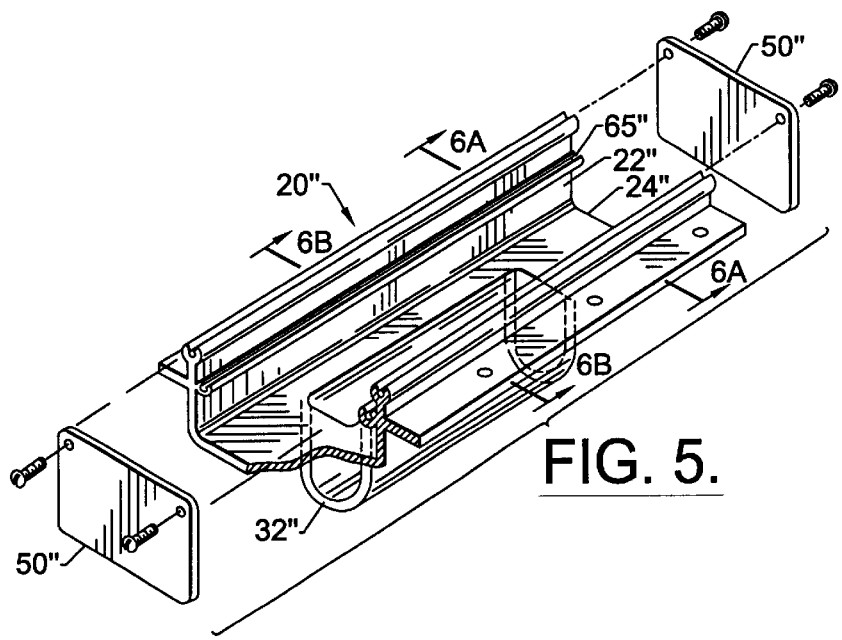
FIG. 5 is an exploded perspective view of an air bag containment structure according to the present invention wherein the inflator housing is formed integrally with the cushion housing.

In FIG. 5, there is illustrated yet another embodiment of the present invention wherein elements corresponding to those illustrated in FIG. 2 are designated by like reference numerals with a double prime. As shown, in the embodiment of the present invention illustrated in FIG. 5, the walled chamber 32" for housing the inflator is formed integrally with the air bag housing structure 20". End caps 50" are applied at the ends of the air bag housing structure 20" to define a recess enclosed on four sides for containment of an inflatable air bag cushion. As will be appreciated, due to the integral relation between the air bag housing 20" and the walled chamber 32" separate attachment mechanisms are not required to secure such elements to one another, thereby substantially eliminating the need for the pressed studs 41 as may be utilized in the non-integral embodiments as previously illustrated and described. In the integral embodiment of the present invention it is contemplated that the air bag cushion will preferably be held within the air bag housing structure 20" by rod receiving channel elements 65" as will be well known to those of skill in the art. It is contemplated that such rod receiving channel elements 65" may be formed integrally with the side walls 22", 23" during a forced extrusion operation.

Figure 6A:
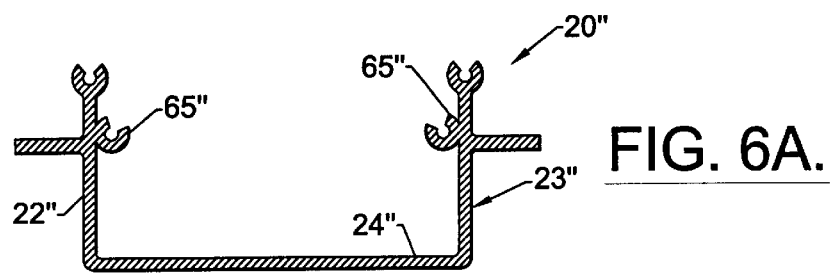
FIG. 6A is an intermediate cross-sectional assembly view of the cushion housing illustrated in FIG. 5 before introduction of the inflator housing chamber.
Figure 6B:
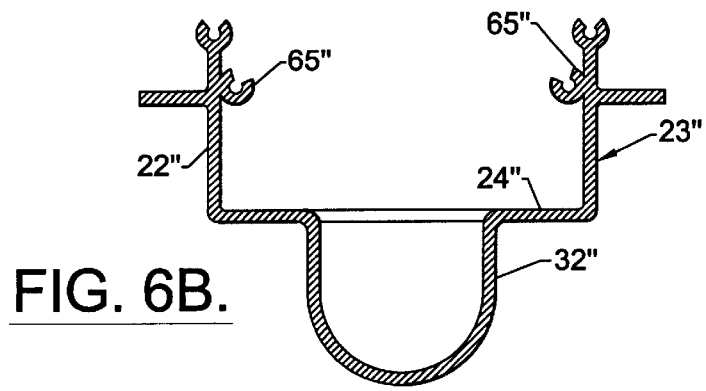
FIG. 6B is a view similar to FIG. 6A subsequent to the introduction of the inflator housing chamber.

According to a potentially preferred practice, the air bag housing structure 20" may be formed integrally with the chamber 32" by first extruding the air bag housing structure 20" including opposing side walls 22", 23" with integral rod receiving channel elements 65", and a substantially flat bottom wall 24" as illustrated in FIG. 6A. Thereafter, a deep drawing process may be applied across the surface of the bottom wall 24" so as to form the chamber 32" in a distending configuration. As will be appreciated, the material from which such a unitary structure is formed must be suitable for both extrusion and deep drawing processes. A metallic material such as aluminum characterized by a face centered cubic crystal structure may be preferred.

In view of the foregoing detailed description, it will be understood that the present invention provides a highly efficient and versatile structure for the containment of an inflatable air bag and gas emitting inflator wherein the housing for the air bag is formed as an open ended structure though use of extrusion formation processes and the housing for the inflator is formed to include an integral chamber of substantially enclosed construction including dimensionally stable end wall segments for the receipt and support of the inflator therein. Such a construction permits the inflator housing to be designed for the specific inflator to be used and to be subsequently mated to cushion housing designed for a particular cushion. Such a configuration also reduces complexity by eliminating the need to apply end caps to the chamber housing the inflator. In addition, the present invention permits the efficient utilization of aluminum and other lightweight materials while maintaining strength requirements.

While the present invention has been illustrated and described in relation to several particularly preferred embodiments and constructions, it is to be understood that such embodiments and constructions are illustrative only and the present invention is in no event to be limited thereto. Rather, it is contemplated that modifications and variations to the present invention will no doubt occur to those of skill in the art upon reading the above description and/or through practice of the invention. It is therefore contemplated and intended that the present invention shall extend to all such modifications and variations which incorporate the broad aspects of the present invention within the full spirit and scope of the following claims and all equivalents thereto.

What is claimed is:

1. An air bag containment structure comprising:
    a cushion housing structure of a depressed channel configuration comprising an open-ended recess disposed between opposing side wall elements such that a folded inflatable air bag cushion may be stored within the recess between the opposing side wall elements;
    end caps non-integral to the cushion housing structure disposed across the ends of the open-ended recess; and
    an inflator housing connected to the cushion housing structure, the inflator housing including an integral chamber of depressed profile for storage of a gas emitting inflator such that the gas emitting inflator is in fluid communication with the inflatable air bag cushion, the integral chamber being of a substantially unitary construction, wherein the end caps comprise protruding flanges integral with the inflator housing and extending outwardly from the inflator housing, which protruding flanges are adapted to slide over the ends of the cushion housing structure.

2. The invention according to claim 1, wherein the cushion housing structure is formed from aluminum.

3. The invention according to claim 2, wherein the inflator housing is formed from a material selected from the group consisting of aluminum and steel.

4. The invention according to claim 1, wherein the cushion housing structure is formed from aluminum and the inflator housing comprises injection molded plastic.

5. The invention according to claim 1, wherein the cushion housing structure is formed from aluminum and the inflator housing comprises die cast metal.

6. A method for forming an air bag containment structure comprising the steps of:
    forming a cushion housing structure of open-ended construction by the forced extrusion of a metallic material wherein the cushion housing structure is of a depressed channel configuration comprising an open-ended recess defined by a bottom wall disposed between opposing side wall elements such that a folded inflatable air bag cushion may be stored within the recess in overlying relation to the bottom wall and between the opposing side wall elements;
    forming a chamber of depressed profile by deep drawing of the bottom wall for storage of a gas emitting inflator in fluid communication with the inflatable air bag cushion; and
    applying end caps across the ends of the open ended recess.

7. The invention according to claim 6, wherein the cushion housing structure is formed such that the opposing side wall elements include integral rod receiving channels for acceptance of air bag retaining rods.

8. The invention according to claim 6, wherein said metallic material is characterized by a face centered cubic crystal structure.

9. The invention according to claim 6, wherein said metallic material is aluminum.

* * * * *